United States Patent
Møller et al.

(10) Patent No.: US 6,810,962 B2
(45) Date of Patent: Nov. 2, 2004

(54) HORSESHOE WITH A RESILIENT INTERMEDIATE LAYER AND A METHOD OF MANUFACTURING SUCH A HORSESHOE

(75) Inventors: Helge Møller, Charlottenlund (DK); Anders Moesgaard, Klampenborg (DK)

(73) Assignee: Triple International ApS, Klampenborg (DK)

( * ) Notice: Subject to any disclaimer, the term of this patent is extended or adjusted under 35 U.S.C. 154(b) by 0 days.

(21) Appl. No.: 10/642,188

(22) Filed: Aug. 18, 2003

(65) Prior Publication Data

US 2004/0031616 A1 Feb. 19, 2004

(51) Int. Cl.⁷ ............................ A01L 7/02; A01L 5/00
(52) U.S. Cl. ........................................... 168/12
(58) Field of Search .............................. 168/11, 12, 23

(56) References Cited

U.S. PATENT DOCUMENTS

| | | | | |
|---|---|---|---|---|
| 458,051 A | * | 8/1891 | Hitch ........................... | 168/12 |
| 619,745 A | * | 2/1899 | Hitch ........................... | 168/11 |
| 641,210 A | * | 1/1900 | Jones ........................... | 168/11 |
| 649,231 A | | 5/1900 | Winquist ...................... | 168/11 |
| 918,094 A | | 4/1909 | Schlegel ....................... | 168/15 |

FOREIGN PATENT DOCUMENTS

| | | |
|---|---|---|
| DK | 19284 | 9/1914 |
| WO | WO-99/65298 | 12/1999 |

* cited by examiner

*Primary Examiner*—Robert P. Swiatek
(74) *Attorney, Agent, or Firm*—Browdy and Neimark, P.L.L.C.

(57) ABSTRACT

In a horseshoe (1) having a resilient intermediate layer (4) positioned to fill out the interspace between a rigid upper and lower parts (2, 3), which are mechanically connected at the front edge of the horseshoe (1), the upper and lower parts (2,3) are, in addition, interconnected by an interlocking device (A: A1; A2) near at least one of the rear edges of the branches of the lower part (3) to prevent separation of the upper and lower parts, while allowing elastic deformation of the resilient intermediate layer (4).

9 Claims, 2 Drawing Sheets

HORSESHOE WITH A RESILIENT INTERMEDIATE LAYER AND A METHOD OF MANUFACTURING SUCH A HORSESHOE

The present invention relates to a horseshoe of the type having a resilient intermediate layer disposed to fill out the interspace between rigid upper and lower horseshoe parts.

BACKGROUND OF THE INVENTTION

Horseshoes of the type with two parts and a resilient intermediate layer therebetween are well known in the art for use e.g. by horses at races and horse shows to provide improved shock-absorption at impact between the horseshoe and the substratum.

In general, prior art two-part horseshoes comprise a hoof contacting plate, a ground contacting plate and an elastic layer interposed between the plates. The ground contacting plate and, possibly, the elastic layer are provided with holes large enough for passage of the head of a nail, while the hoof contacting plate is provided with smaller holes. Thereby, the nail head may engage with the hoof contacting plate or the interposed elastic layer.

WO 99/65298 discloses a shock-absorbing horseshoe, in which a resilient intermediate layer completely fills out the interspace between the upper and lower parts, the lower part being shorter than the upper part. The intermediate layer is secured to the upper and lower parts by adhesion of the resilient material used for the intermediate layer. Connection of the horseshoe with the hoof by conventional nails is accomplished solely by the engagement of the nail heads with the resilient intermediate layer. The two parts of the horseshoe are kept together by a combination of a rigid mechanical connection at the front of the horseshoe and the adhesive provided by from the resilient intermediate layer.

Danish patent No. 19,298 discloses a two-part horseshoe in which rear edges of the upper part are connected with the rear edges of the lower part by bolts. The bolt includes a head extending outside the horseshoe and functioning as a take-off. The bolt has a thread engaged with the lower part and passes through a knob of resilient material between the two parts into a hole in the upper part without being connected to the latter. Because of the lack of mechanical connection with the upper part the bolt may move freely up and down inside the hole in the upper part.

Whereas the construction of these two prior art horseshoes provides for a shock-absorbing effect, both have the disadvantage that the lower part is secured to the upper part solely by the mechanical connection at the front edge of the horseshoe and, in the case of the horseshoe disclosed in WO99/65298, partly by the adhesion of the resilient intermediate layer to the upper and lower parts. Due to the deflection of the two parts in use of the horseshoe, the front edge is subject to wear, resulting ultimately in destruction of the horseshoe by fracture and separation of the two parts.

This problem becomes even more pronounced with use of a soft and thus more comfortable material for the intermediate layer, because a softer material will require a more rigid mechanical connection at the front edge of the horseshoe when subjected to stress. In result, fatigue may occur in that part of the horseshoe and ultimately the lower part of the horseshoe may break off.

As evident from Danish patent specification No. 19,284 use of a further connecting means such as bolts to keep the upper an lower parts together may entail the problem that during use of the horseshoe such bolts may enter into the hoof of the horse and cause significant pain.

The same problem occurs with a horseshoe design disclosed in U.S. Pat. No. 918,094. This prior art horseshoe comprises a one-piece member provided with detachable plates and an interposed rubber filling near the rear ends of the horseshoe branches. The detachable plates and the rubber filling are held in place by engagement between lugs and openings in the lower part and the detachable plates and are further connected by a screw having a head engaged with the one-piece part and passing through the rubber filling for engagement with a thread in the detachable plate. Like the bolts used in Danish patent No. 19,284 this screw head may penetrate into the hoof and cause pain to the horse.

SUMMARY OF THE INVENTION

On the background of the state of the art as described it is the object of the invention to further improve the integrity of a horseshoe of the type defined without causing discomfort or pain to the horse.

In accordance with a first aspect of the present invention an improved horseshoe is provided, having a front edge and comprising a rigid upper part for engagement with the lower side of the hoof of the horse and a rigid lower part mechanically connected with the upper part at said front edge, the lower part extending at least under a part of the upper part, said upper and lower parts forming horseshoe branches each providing a rear edge, and a resilient intermediate layer positioned to fill out the interspace between the upper and lower parts, wherein the improvement comprises interlocking means for interconnection of the upper and lower parts adjacent to at least one of the rear edges of the branches of the lower part to prevent separation of the upper and lower parts, while allowing elastic deformation of the resilient intermediate layer.

Thereby, the upper and lower horse shoe parts become safely interlocked and thus prevented from falling apart, while still maintaining the intended functionality of the resilient intermediate layer with respect to improved dampening at impact of the horse hoof against the substratum, stable engagement with the substratum at take-off of the hoof and safe securing with respect to the hoof.

In addition, the horseshoe according to the invention provides a simple construction enabling manufacture at a competitive price.

Preferably the interlocking means is loosely connected with the upper part and rigidly connected with the lower part.

This is advantageous in two ways. Firstly the interlocking means does not prevent the resilient compression of the intermediate layer between the two parts during use. Secondly, the interlocking means is held securely inside the horseshoe by the rigid mechanical connection to the lower part.

In one embodiment said interlocking means extends through a hole formed in the upper part. In another embodiment an upper surface of the interlocking means is separated from an upper surface of the upper part to provide a clearance between said upper surfaces. Preferably, this clearance is filled out with resilient material.

The latter embodiment is advantageous by providing a "cushion" in the clearance between the head of the interlocking means and the hoof of the horse. When the intermediate resilient layer is compressed during use, whereby the head is pressed upwards towards the underside of the hoof this cushion will prevent the head of the interlocking means from penetrating into the hoof.

In one embodiment, the resilient material filled nto the clearance is the same as the material constituting the resilient intermediate layer.

Thereby, the cushion may be formed in said clearance in the same single process as the filling of material to form the resilient intermediate layer.

In one embodiment, the resilient intermediate layer consists of a moulded resilient plastic material, preferably polyurethane.

Resilient plastics and rubbers have good working properties and may by moulding be brought to adhere well to the surfaces of the upper and lower parts. In particular, polyurethane (P) has turned out to be a suitable material as tests have demonstrated it to be a well performing resilient and durable material.

In one embodiment, a low-cost and simple interlocking means is provided by a rivet- or screw-like member rigidly secured in the lower part and having a substantially flat head adapted to be positioned in said hole.

In accordance with a second aspect of the present invention, there is provided a method for manufacturing a horseshoe having a front edge and comprising a rigid upper part for engagement with the lower side of the hoof of the horse and a rigid lower part mechanically connected with the upper part at said front edge, the lower part extending at least under a part of the upper part, said upper and lower parts forming horseshoe branches each providing a rear edge, a resilient intermediate layer positioned to fill out the interspace between the upper and lower parts, and interlocking means for interconnection of the upper and lower parts adjacent to at least one of the rear edges of the branches of the lower part to prevent separation of the upper and lower parts, while allowing elastic deformation of the resilient intermediate layer according to any of the preceding claims, said method comprising the steps of:

- cutting or punching said upper and lower parts from sheet material, preferably steel sheet;
- disposing said upper and lower parts to extend substantially parallel to each other with an interspace therebetween;
- disposing said interlocking means to interconnect the upper and lower parts near at least one of the rear edges of the branches of the lower part to prevent separation of the upper and lower parts, while allowing elastic deformation of the resilient intermediate layer; and
- embedding resilient material into the interspace between the upper and lower parts to form said resilient intermediate layer.

In a preferred implementation of this method at least one hole is formed at a position in the upper part in alignment with a position near the rear edges of the branches of the lower part and said interlocking means is arranged in said hole with an upper surface of the interlocking means separated from an upper surface of the upper part to provide a volume between said upper surfaces; and said resilient material is embedded to fill out said volume.

The upper and lower horse shoe parts may be made from any suitable material having the required rigidity and wearability, but typically a metal with good wearability and good working properties like for instance steel is chosen.

BRIEF DESCRIPTION OF THE SEVERAL VIEWS OF THE DRAWINGS

The invention will now be explained in detail with reference to the schematic drawing, in which.

Figure 1:
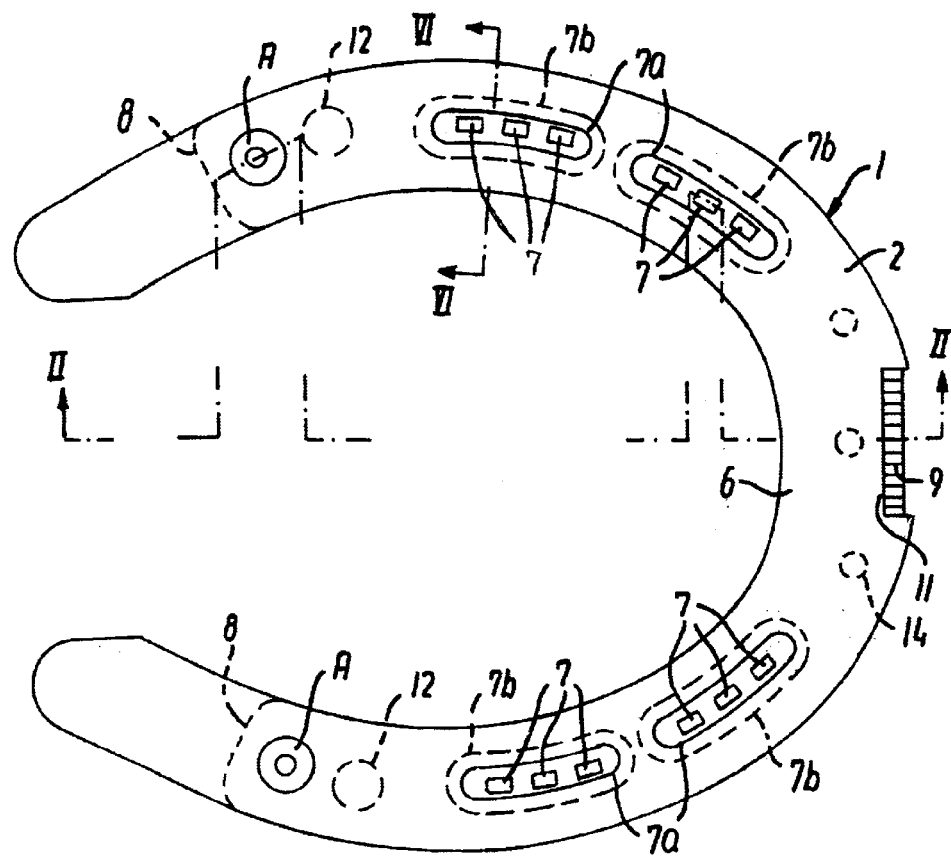
FIG. 1 is a top plan view of one embodiment of a horseshoe according to the invention.

The horseshoe 1 in FIG. 1 is shaped in the usual manner according to the hoof of a horse with a front portion coherent with two backwards-facing branches. In the horseshoe 1, nail holes 7 are provided such that the horseshoe may be nailed to the lower side of the hoof of the horse by means of usual horseshoe nails 13. In the backwards facing branches of the horseshoe threaded holes 12 may be provided in the horseshoe 1 for the screwing in of a modax to enable the horse to stand firm on a slippery or loose substratum such as ice or snow or in connection with riding in rough terrain.

Figure 2:
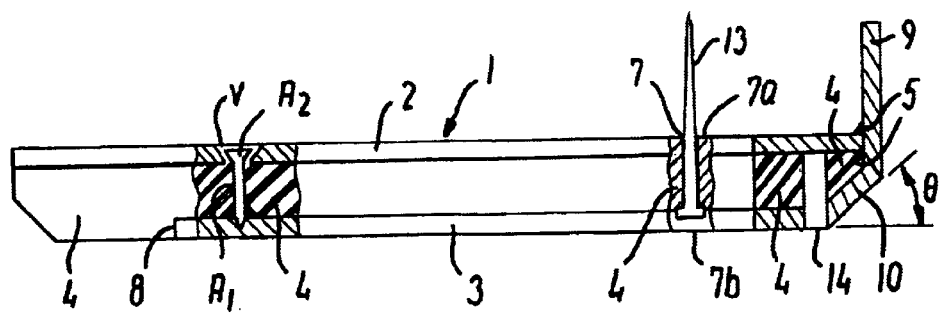
FIG. 2 is a partly sectional view along the line II—II in FIG. 1.

As shown in FIG. 2, the horseshoe 1 comprises a rigid upper part 2 for engagement with the lower side of the hoof of the horse, a rigid lower part 3 for contacting the substratum and an intermediate layer 4 consisting of a shock-absorbing resilient material between the upper part 2 and the lower part 3. By the term "rigid" is to be understood a material property in the form of a high E-module relative to the shock-absorbing material in the intermediate layer 4, which typically has a comparatively low E-module. The shock-absorbing intermediate layer 4 fills out the entire intermediate space between the substantially parallel upper and lower parts, 2, 3. Inside the intermediate layer 4 nail holes 7 are disposed in alignment with elongated holes 7a, 7b in the upper and lower parts 2, 3, respectively.

The upper and lower parts 2, 3 may be made from plane steel sheets. In FIG. 2 the two parts are shown with substantially equal thickness, but they may of course be of different thickness. At the front portion 6 of the horseshoe 1, the lower part 3 is provided with a toe clip 9 serving as abutment for the front edge of the hoof and having the shape of an extension coherent with the lower part 3, said extension being bent upwards from the lower part 3. At the front portion 6 an area 10 of the lower part is furthermore bent upwards under an angle θ with the lower side of the lower part 3, said angle for example being in the range of 15–20°, for the provision of a take-off roller surface for the horseshoe 1. Holes may be provided at or on the oblique take-off roller surface 10 for receiving specially-designed, preferably hardened pins 14 with a substantially flat head in view of increasing wearability and thereby providing the possibility of use of the horseshoe 1 on a hard substratum like asphalt. The wearability of the horseshoe 1 is increased by the pin(s) 14 advantageously distributing the shock experienced by the rigid mechanical connection at the front at the time of impact with the stratum. The hardened pins 14 are preferably attached to the lower part 3 by the provision of a hole in the lower part and a pin 14, where the hole and the pin have such diameters that the pin may be pressed into the hole and retained by friction alone. The pins 14 may also be provided without hardening; then the pins may be attached to the lower part through a screw fit, welding or the like.

A recess 11 is provided in the upper part 2 at the front portion 6, in which the upwards bent toe clip 9 is received. In this manner a mechanical connection may be provided between the upper part 2 and the lower part 3, and it may be stiffened to a rigid mechanical connection by providing welds 5 in the transverse direction of the horseshoe in the recess 11.

The connection at the front edge of the front portion 6 has a hinge function such that the upper part 2 and the lower part 3 at the backwards facing branches of the horseshoe 1 may comparatively easily be moved towards and away from each other under elastic deformation of the intermediate layer 4. In the case a rigid mechanical connection for example like a welding 5 is provided at the front portion 6, the rigid connection does not hamper the shock-absorption owing to the resilience of the steel at this connection.

As shown in FIG. 2 the backwards facing branches of the lower part 3 are somewhat shorter than the backwards facing branches of the upper part 2, such that the rear edges of the lower part 3 are positioned somewhat ahead of the rear edges of the upper part 2. By extending the intermediate layer 4 to the rear edges of the backwards facing branches of the upper part 2, an optimal shock-absorbing effect with a particularly gentle touch is obtained in the rear part of the horseshoe, which is the part first hitting the substratum.

As shown in FIG. 2, the embodiment includes interlocking means A provided in holes in the upper part 2. The holes are preferably positioned as near the two edges 8 of the backwards facing branches of the lower part 3 of the horseshoe as possible, depending on the type of material used for the lower part and the width and thickness of the lower part at this place. However, the interlocking means A may also be placed further towards the front portion 6 of the horseshoe, i.e. closer to the nails 13 in the horseshoe.

The embodiment shown on the drawing is provided with an interlocking means A preferably in the form of a countersunk rivet-like member A1 with a substantially flat head A2, and in the upper part 2 a hole for the interlocking means A is preferably formed with a chamfer, such that largest diameter of the head A2 of the rivet-like member A1 is substantially larger than the diameter of the lower part of the hole. The other end of the rivet A1 is rigidly connected to the lower part 3 e.g. by welding or by closing the rivet. As mentioned in the foregoing, the interlocking means could as an alternative to the rivet-like member A1 comprise a screw-like member secured in a threaded bore in the lower part 3.

The hole formed in the upper part 2 as shown in FIG. 2 for accommodation of the rivet-like member A1 is additionally formed in such a way as to provide a clearance v of the head A2 of the rivet-like member A1 with respect to the upper surface of the upper horse shoe part 2 as well as the chamfered surface of the hole. Preferably, this volume is filled with resilient material, creating a "cushion" in the clearance v.

The nail holes 7 in the intermediate layer 4 are accessible through the elongated holes 7a and 7b in the upper and lower parts 2 and 3, respectively. As shown in FIGS. 1 and 2, the elongated holes 7a, 7b may be made with a size accommodating three nail holes 7 in the intermediate layer. The elongated holes 7b in the lower part 3 is of a size allowing the nail heads to pass for abutment on and local resilient compression of the shock-absorbing intermediate layer 4. At the nailing of the horseshoe 1 in the hoof of a horse, a nail 13 will, when driven in, resiliently compress the shock-absorbing layer 4. When the horseshoe 1 is subsequently subjected to weight, it will be possible for the lower part 3 to be pressed against the upper part 2, without influencing the securing of the upper part to the hoof. This is due to the fact that due to its resiliency the intermediate layer will act like "cushions" against the nails 13, whereby compressibility of the layer will substantially not be affected by movement of the lower part horse shoe 3.

By the manufacture of the horseshoe 1 according to the invention the upper part 2 and the lower part 3 are first punched or cut from sheet material, preferably steel sheet, either as two separate parts or a single coherent part, providing holes as necessary in the parts 2, 3 for accommodation e.g. of nails 13, interlocking means A, modax etc.

Following separate punching of the parts 2, 3, e.g. as shown in FIGS. 1 and 2, the take-off roller surface 10 and the toe clip 9 are bent up from the lower part 3. If desired, a rigid mechanical connection between the upper and lower parts 3 may be made, said connection is made e.g. by welding. During this step of the manufacturing process, the upper and lower parts 2,3 are arranged to extend substantially parallel to each other with an interspace between them. Inside the interspace, the intermediate layer 4 is subsequently formed by embedding a shock-absorbing resilient material, preferably polyurethane, directly therein.

Preferably, the interlocking means A are provided before the intermediate layer 4 is embedded between the upper and lower parts 2, 3. Thereby, the arrangement is stabilized during the embedding process. The interlocking means A may alternatively be provided after embedding.

In the embedding process, the parts 2, 3, preferably including the interlocking means, are placed in a mould leaving space for moulding of the intermediate layer 4 to extend beyond the rear edges of the backwards facing branches of the lower part 3. During the moulding, suitable core elements 30 are used to form the nail holes 7 with associated countersinking in the intermediate layer 4.

Figure 3:
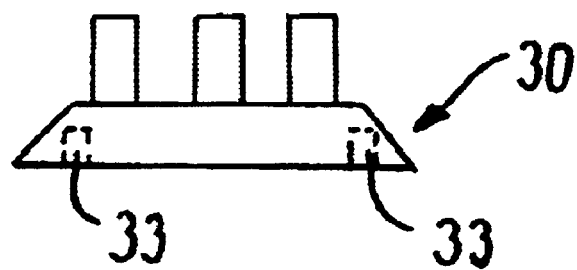
FIG. 3 shows an example of a core element to provide nail holes for the horseshoe.
Figures 4, 5:
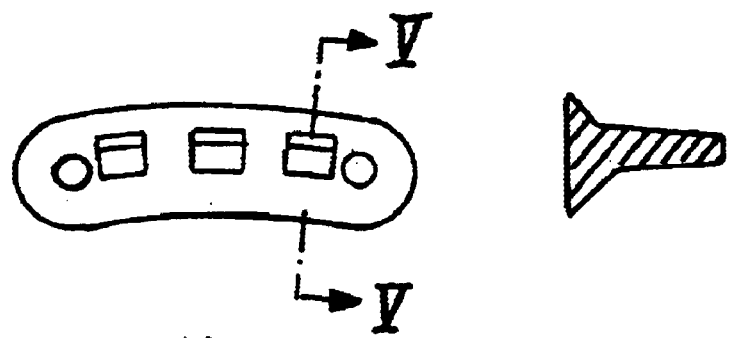
FIG. 4 is a top view of the core element in FIG. 3.
FIG. 5 is a sectional view along the line V—V in FIG. 4.

FIGS. 3 to 5 are schematic views of an example of a core element 30 that may be used to provide in this case three nail holes 7 with countersinking in the horseshoe 1. Before moulding begins, the necessary number of core elements 30 are inserted, such that the lower surface of the core element is at the same level as the lower surface of the lower part 3. Moulding of the resilient material is performed after all core elements have been inserted. Holes 33 may be provided in the core element to facilitate removal of the core element after moulding. After removal of the core elements, it is thus possible to insert the required number of horseshoe nails 13 in the pre-shaped nail holes 7 in the intermediate layer 4. Thus, when subsequently looking at the under side of the horseshoe 1, the heads of the three nails 13 will be seen protruding from the resilient material inside the larger elongated hole 7b in the lower part 3.

Figure 6:
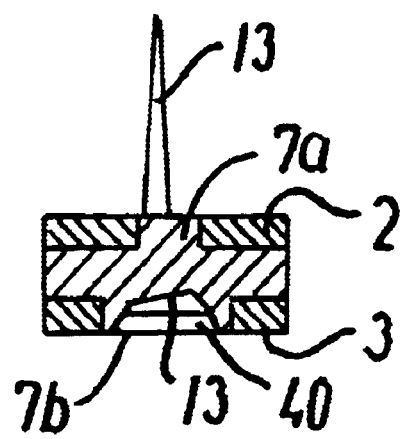
FIG. 6 is a sectional view along the line VI—VI in FIG. 1.

FIG. 6 is a sectional view through the horseshoe 1 between two nails 13, showing the upper and lower parts 2, 3, the intermediate layer 4, and a nail 13. As apparent from the figure, the countersinking in the intermediate layer 4 resulting from the core element 30 form a through-shaped cavity 40 in the intermediate layer 4, leaving a free space between the nail heads. In another embodiment, the nail holes 7 in the intermediate layer may, by means of a corresponding core element, also be formed without leaving such free space between the nail heads.

In a particularly advantageous embodiment of the invention the abovementioned clearance v is filled out with the same resilient material as used for the intermediate layer 4. The embedding of material into the clearance may thereby be performed in the same moulding operation as the embedding of the intermediate layer 4.

What is claimed is:

1. A horseshoe having a front edge and comprising a rigid upper part for engagement with the lower side of the hoof of the horse and a rigid lower part mechanically connected with the upper part at said front edge, the lower part extending at least under a part of the upper part, said upper and lower parts forming horseshoe branches each providing a rear edge, a resilient intermediate layer being positioned to fill out an interspace between the upper and lower parts, interlocking means for interconnection of the upper and lower parts being provided adjacent to at least one of the rear edges of the branches of the lower part to prevent separation of the upper and lower parts, while allowing elastic deformation of the resilient intermediate layer, wherein the improvement comprises said interlocking means providing an upper surface separated from an upper surface of the upper part to provide a clearance between said upper surfaces, said clearance being filled out with resilient material.

2. A horseshoe according to claim 1, wherein said interlocking means is loosely connected with the upper part and rigidly connected with the lower part.

3. A horseshoe according to claim 2, wherein said interlocking means extends through a hole formed in the upper part.

4. A horseshoe according to claim 3, wherein the interlocking means comprises a rivet- or screw-like member rigidly connected with the lower part and having a substantially countersunk head (A2) adapted to be positioned in said hole.

5. A horseshoe according to claim 1, wherein said resilient material is of the same material as the resilient intermediate layer.

6. A horseshoe according to claim 1, wherein the resilient intermediate layer consists of a moulded resilient plastic material.

7. A horseshoe according to claim 6, wherein the moulded resilient plastic material is polyurethane.

8. A method for manufacturing a horseshoe having a front edge and comprising a rigid upper part for engagement with the lower side of the hoof of the horse and a rigid lower part mechanically connected with the upper part at said front edge, the lower part extending at least under a part of the upper part, said upper and lower parts forming horseshoe branches each providing a rear edge, a resilient intermediate layer positioned to fill out the interspace between the upper and lower parts, and interlocking means for interconnection of the upper and lower parts adjacent to at least one of the rear edges of the branches of the lower part to prevent separation of the upper and lower parts, while allowing elastic deformation of the resilient intermediate layer according to any of the preceding claims, said method comprising the steps of:

cutting or punching said upper and lower parts from sheet material;

disposing said upper and lower parts to extend substantially parallel to each other with an interspace therebetween;

disposing said interlocking means to interconnect the upper and lower parts near at least one of the rear edges of the branches of the lower part to prevent separation of the upper and lower parts, while allowing elastic deformation of the resilient intermediate layer; and embedding resilient material into the interspace between the upper and lower parts to form said resilient intermediate layer.

9. A method as claimed in claim 8, wherein at least one hole formed at a position in the upper part in alignment with a position near the rear edges of the branches of the lower part and said interlocking means is arranged in said hole with an upper surface of the interlocking means separated from an upper surface of the upper part to provide a volume between said upper surfaces; and said resilient material is embedded to fill out said volume.

* * * * *